US010581321B1

(12) United States Patent
    Xiong

(10) Patent No.: US 10,581,321 B1
(45) Date of Patent: Mar. 3, 2020

(54) FLYBACK CONVERTER WITH MULTIPLIER SIGNAL CONTROL CIRCUIT AND METHOD

(71) Applicant: UNIVERSAL LIGHTING TECHNOLOGIES, INC., Madison, AL (US)

(72) Inventor: Wei Xiong, Madison, AL (US)

(73) Assignee: Universal Lighting Technologies, Inc., Madison, AL (US)

(*) Notice: Subject to any disclaimer, the term of this patent is extended or adjusted under 35 U.S.C. 154(b) by 0 days.

(21) Appl. No.: 16/423,360

(22) Filed: May 28, 2019

Related U.S. Application Data

(60) Provisional application No. 62/678,357, filed on May 31, 2018.

(51) Int. Cl.
*H02M 1/42* (2007.01)
*H02M 1/00* (2006.01)
*H02M 3/335* (2006.01)

(52) U.S. Cl.
CPC ....... *H02M 1/4208* (2013.01); *H02M 1/0061* (2013.01); *H02M 3/3353* (2013.01); *H02M 2001/0003* (2013.01)

(58) Field of Classification Search
CPC ............. H02M 1/4208; H02M 1/0061; H02M 3/3353; H02M 2001/0003
See application file for complete search history.

(56) References Cited

U.S. PATENT DOCUMENTS

| 8,222,772 | B1* | 7/2012 | Vinciarelli | H02M 1/4258 307/140 |
| 8,471,488 | B1* | 6/2013 | Hopkins | H02M 1/4258 315/247 |
| 9,166,483 | B2 | 10/2015 | Levy | |
| 10,263,508 | B2* | 4/2019 | Davidson | H02M 1/42 |
| 2010/0308733 | A1* | 12/2010 | Shao | H02M 1/4225 315/119 |
| 2011/0292704 | A1* | 12/2011 | Makino | H02M 1/4208 363/126 |
| 2013/0044521 | A1* | 2/2013 | Zhao | H02M 3/335 363/21.17 |
| 2016/0261199 | A1* | 9/2016 | Adragna | H02M 3/33523 |
| 2016/0336870 | A1* | 11/2016 | Halim | H02M 1/4225 |

* cited by examiner

*Primary Examiner* — Emily P Pham
(74) *Attorney, Agent, or Firm* — Patterson Intellectual Property Law, P.C.; Gary L. Montle; Alex H. Huffstutter

(57) ABSTRACT

A multiplier signal, and multiplier circuits and methods are provided to improve the total harmonic distortion (THD) and power factor (PF) for a flyback type power factor correction (PFC) circuit. The multiplier signal has a "pulled-up" waveshape that is configured to compensate for the "push-down" effect of varying off times of an electronic switch of the PFC on a line current of the PFC. The multiplier circuit is configured to reduce the multiplier signal during a first operational mode of the multiplier circuit and is further configured to maintain a typical multiplier signal during a second operational mode. The first operational mode occurs before a first phase angle and after a second phase angle during each half-cycle of a power source coupled to the PFC circuit. The second operational mode occurs between the first and second phase angles during each half-cycle.

19 Claims, 7 Drawing Sheets

FLYBACK CONVERTER WITH MULTIPLIER SIGNAL CONTROL CIRCUIT AND METHOD

CROSS-REFERENCES TO RELATED APPLICATIONS

This application claims benefit under 35 USC. § 119(e) of U.S. Provisional Patent Application No. 62/678,357, filed May 31, 2018, entitled "Flyback Converter with Multiplier Control Circuit and Method."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to two-stage power supply circuits having a power factor correction circuit as a first stage and a DC-DC converter as a second stage. More particularly, the disclosure pertains a portion of the power factor correction circuit referred to herein as a multiplier circuit.

BACKGROUND

A typical power supply circuit receives power from an AC source. During a normal mode of operation, the power supply circuit generates either a constant voltage or a constant current to a DC load. The power supply circuit includes a first-stage power factor correction (PFC) circuit that operates to maintain the current drawn from the AC source substantially in phase with the voltage of the AC source. The PFC circuit provides a first-stage output voltage to a second-stage DC-to-DC converter circuit. The second-stage DC-to-DC converter circuit generates the constant voltage or the constant current for the DC load.

The power factor correction circuit may be based on a boost converter or a buck-boost converter. One type of buck-boost converter is a flyback converter. A boost converter can only produce an output voltage that is greater than the input voltage. A flyback converter can also produce an output voltage that is greater than the input voltage. Unlike a boost converter, a flyback converter can also produce an output voltage that is less than the input voltage. Although both types of converters can be used in a power factor correction (PFC) circuit, a PFC converter based on a boost converter topology typically can achieve a greater power factor (e.g., closer to 1) than a PFC converter based on a flyback topology. A PFC converter based on a boost converter topology typically has a lower total harmonic distortion than a PFC converter based on a flyback technology. The foregoing is summarized in the following table for an exemplary 50-watt PFC:

TABLE I

Power Factor (PF) and THD for 50-watt Flyback PFC and Boost Type PFC

| | 50-Watt PFC | | | |
|---|---|---|---|---|
| | Flyback Type PFC | | Boost Type PFC | |
| $V_{IN}$ | THD | PF | THD | PF |
| 120 V | 8% | 0.96 | 3% | 0.99 |
| 277 V | 18% | 0.9 | 8% | 0.96 |

Table I illustrates that a lower power factor and greater THD is a drawback for using flyback type PFC converter circuits instead of boost type PFC converter circuits.

As is well known in the art, a reduced power factor results from two main contributing factors. One factor is the THD of the "line current," which as used herein may for example refer to the current through a flyback inductive element (e.g., primary transformer winding). Another factor is a phase-shift $\beta$ between the line current and the "line voltage", or voltage across a DC source as the input for the PFC. The power factor (PF) can be defined in terms of the two contributing factors as follows:

$$PF = \frac{1}{\sqrt{1 + (THD)^2}} \times \cos(\beta) \qquad (1)$$

Both the flyback type PFC converter circuit and the boost type PFC converter circuit can force the input current to be in phase with the input voltage. Accordingly, the phase-shift $\beta$ is not the main contributing factor in causing the flyback type PFC converter to have a poorer (e.g., lower) power factor. The experimental results shown in Table I support a conclusion that the reduction in power factor caused by input current distortion (e.g., THD) is much higher for a flyback type PFC converter in comparison to a boost type PFC converter.

BRIEF SUMMARY

A need exists for improving (increasing) the power factor of a flyback type PFC converter by reducing the total harmonic distortion (THD) of the input current. As described herein, the THD is reduced by forcing the line current waveform to be closer to an ideal input voltage waveform such that the line current waveform is sinusoidal like the input voltage waveform.

Multiplier circuit structures as disclosed herein can effectively achieve that goal with minimal alteration to the overall PFC circuit. Various exemplary embodiments of a multiplier circuit of the PFC circuit as disclosed herein can alter a multiplier signal and thus alter a waveshape of current through a primary winding of the PFC circuit to improve THD performance and increase the power factor of PFC circuit.

In one exemplary embodiment of a power supply as disclosed herein, the power supply comprises a direct current (DC) power source coupled to receive input power from an alternating current (AC) power source and configured to provide a DC power across first and second lines. An energy storage device is coupled across the first and second lines, in parallel with a power factor correction (PFC) circuit which further comprises an inductive element coupled on a first end to a first end of the energy storage device, a controlled switching element coupled between a second end of the inductive element and the second line, and an integrated circuit (IC) configured to control on-times and off-times of the switching element and thereby a current through the inductive element in response to a multiplier signal received at a multiplier signal input of the IC. A multiplier circuit comprises a switching device and is configured to define the multiplier signal to the multiplier signal input by switching between a first operational mode of the multiplier circuit and a second operational mode of the multiplier circuit during each half-cycle of the DC power, wherein the multiplier signal is provided as an ideal sinusoid corresponding to a shape of the input power from the AC power source independently of varying off-times of the PFC switching element.

In one exemplary aspect of the aforementioned embodiment, the multiplier signal is modified to push down a waveform shape of the primary current during the first operational mode, wherein a total harmonic distortion (THD) of the PFC circuit is reduced.

In an embodiment, the first operational mode of the multiplier circuit is associated with a voltage across the energy storage device being below a threshold voltage, and the second operational mode of the multiplier circuit is associated with the voltage across the energy storage device being above the threshold voltage.

In an embodiment, the provided DC power includes a DC voltage waveform, wherein the first operational mode of the multiplier circuit occurs before a first phase angle of the DC voltage waveform and after a second phase angle of the DC voltage waveform during each half-cycle of the DC power, and the second operational mode of the multiplier circuit occurs between the first and second phase angles of the DC voltage waveform during each half-cycle of the DC power.

In an embodiment, the multiplier circuit includes a first resistor, a second resistor, a third resistor, a fourth resistor, a fifth resistor, and the switching device is configured to switch between the first operational mode and the second operational mode during each half-cycle of the DC power. The first operational mode is associated with the switching device being off and the second operational mode associated with the switch being on.

In one exemplary aspect of the aforementioned embodiment, the switching device comprising a base node, a collector node, and an emitter node coupled to the multiplier signal input terminal. The first resistor is coupled between the first line and the collector node, the second resistor is coupled between the emitter node and the second line, the third resistor is coupled between collector node and the emitter node, the fourth resistor is coupled between the first line and the base node, and the fifth resistor is coupled between the base node and the second line.

In another exemplary aspect of the aforementioned embodiment, the first, second, and third resistors are coupled in series when the multiplier circuit is in the first operational mode, and the third resistor is short circuited when the multiplier circuit is in the second operational mode.

In another embodiment, the multiplier circuit includes a first resistor and the switching device comprises a Zener diode coupled between the first line and the multiplier signal input terminal. The multiplier circuit includes a second resistor coupled between the multiplier signal input terminal and the second line.

In one exemplary aspect of the aforementioned embodiment, the Zener diode is associated with a Zener voltage. The multiplier circuit operates in the first operational mode when the voltage across the capacitor is below the Zener voltage, and operates in the second operational mode when the voltage across the capacitor is above the Zener voltage.

In another embodiment, the multiplier circuit includes a first resistor, a second resistor, a third resistor, and the switching device comprises a DIAC. The first resistor is coupled to the first line, and the DIAC and the third resistor are coupled in parallel between the first resistor and the multiplier signal input terminal. The second resistor is further coupled between the multiplier signal input terminal and the second line.

In one exemplary aspect of the aforementioned embodiment, the DIAC is associated with a breakdown voltage, wherein the multiplier circuit operates in the first operational mode when the voltage across the capacitor is below the breakdown voltage, and the multiplier circuit operates in the second operational mode when the voltage across the capacitor is above the breakdown voltage.

In another exemplary aspect of the aforementioned embodiment, the DIAC operates as an open circuit during the first operational mode, and the DIAC short circuits the third resistor during the second operational mode.

In another embodiment, the multiplier signal includes a multiplier signal waveform shape defined during each half-cycle of the DC power. A beginning portion and an end portion of the multiplier signal waveform shape is defined during the first operational mode of the multiplier circuit, and a middle portion of the multiplier signal waveform shape is defined during the second operational mode of the multiplier circuit.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
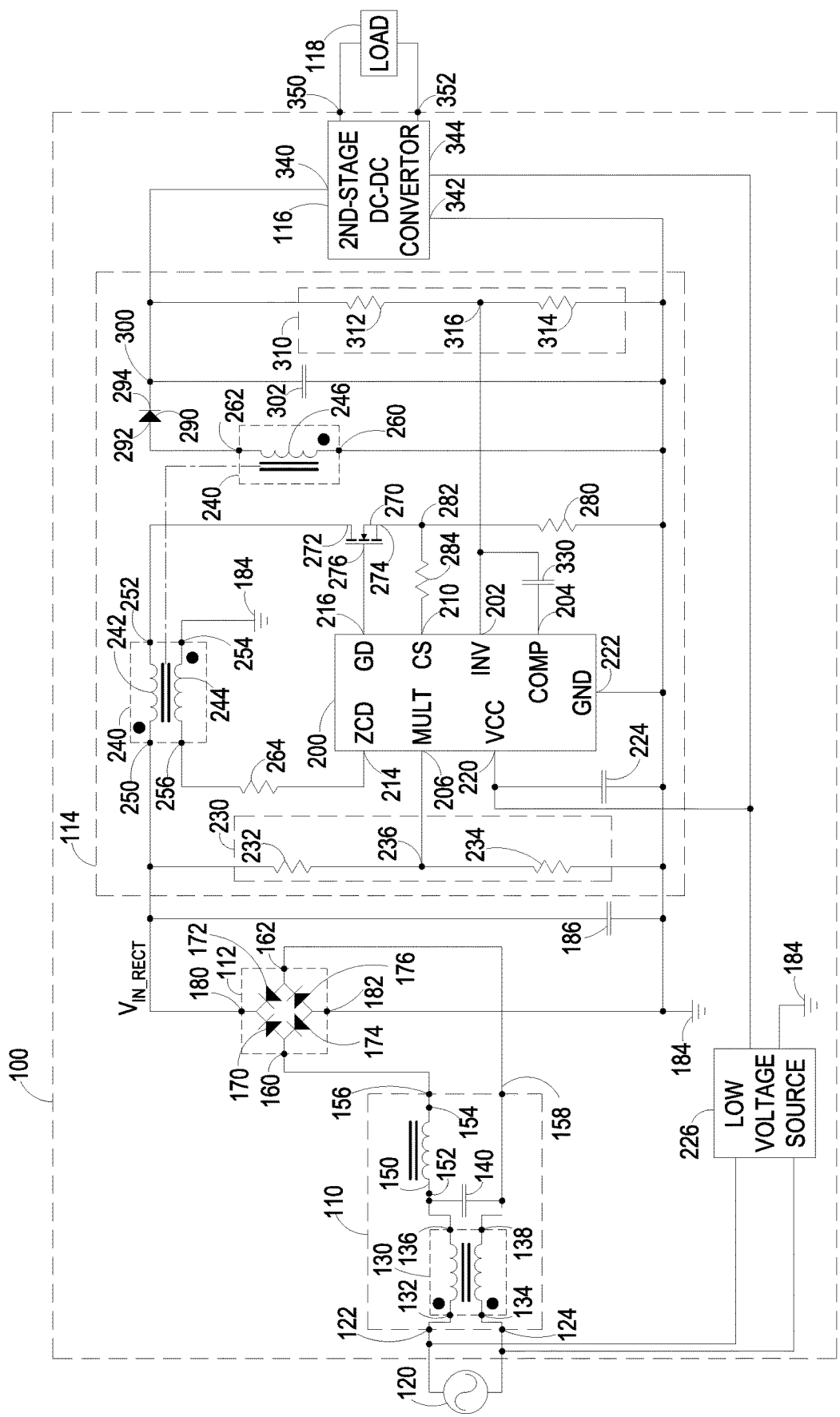
FIG. 1 is a topology of a typical conventional two-stage electronic switching power supply.

FIG. 1 illustrates a topology of a typical conventional two-stage electronic switching power supply 100. The power supply includes four general blocks—an EMI control circuit 110, a rectifier circuit 112, a first-stage circuit 114, and a second-stage circuit 116. As described below, the first-stage circuit is a power factor correction (PFC) circuit. In the illustrated embodiment, the second stage circuit is a DC-DC convertor circuit. The second-stage circuit provides power to a DC load 118, which may be, for example, a plurality of interconnected light-emitting diodes (LEDs).

An AC source 120 provides AC power across a first (line) input 122 and a second (neutral) input 124 of the EMI control circuit 110. In particular, the line input is connected to a conventional line conductor of the AC source, and the neutral input is connected to a conventional neutral conductor of the AC source. The connections may be accomplished by hardwiring connections to the AC source or by inserting an AC plug into an AC outlet.

The EMI control circuit 110 comprises a common mode EMI choke 130 having a first input 132 connected to the line input 122 from the AC source 120 and having a second input 134 connected to the neutral input 124 from the AC source. The common mode EMI choke has a first output 136 and a second output 138. An X-type EMI filter capacitor 140 is connected between the first output and the second output of the common mode EMI choke. The first output of the common mode EMI choke is connected to a first terminal 152 of a differential mode EMI inductor 150. A second terminal 154 of the differential mode EMI inductor is connected to a first EMI circuit output terminal 156. The second output of the common mode EMI choke is connected to a second EMI circuit output terminal 158.

The AC power passes through the EMI control circuit 110 and is provided across a first input terminal 160 and a second input terminal 162 of the rectifier circuit 112. The rectifier circuit is configured as a full-wave bridge rectifier circuit that comprises a first rectifier diode 170, a second rectifier diode 172, a third rectifier diode 174, and a fourth rectifier diode 176, which are connected as shown.

The first input terminal 160 of the rectifier circuit 112 is connected to the anode of the first rectifier diode 170 and to the cathode of the third rectifier diode 174. The second input terminal 162 of the rectifier circuit is connected to the anode of the second rectifier diode 172 and to the cathode of the fourth rectifier diode 176.

The cathodes of the first rectifier diode 170 and the second rectifier diode 172 are commonly connected to a positive voltage ($V_{IN\_RECT}$) output terminal 180 of the rectifier circuit 112. The anodes of the third rectifier diode 174 and the fourth rectifier diode 176 are commonly connected to a reference voltage output terminal 182, which is connected to a local circuit ground connection 184. A rectifier output filter capacitor 186 is connected between the positive voltage output terminal and the reference voltage output terminal of the rectifier circuit. The rectifier circuit generates a full-wave rectified output voltage across the rectifier output filter capacitor in a conventional manner to convert AC power from the AC source 120 into DC power to be supplied across the positive voltage output terminal 180 and the reference voltage output terminal 182.

The first-stage circuit ("PFC circuit") 114 in FIG. 1 is configured as a boost converter operating in the critical conduction mode. The PFC circuit is coupled across the filter capacitor 186 between the positive voltage output terminal 180 and the reference voltage output terminal 182 of the rectifier 112. The PFC circuit includes a power factor corrector integrated circuit (PFC IC) 200. In the illustrated embodiment, the PFC IC comprises an L6561 PFC IC, which is commercially available from STMicroelectronics of Geneva, Switzerland. Other power factor corrector integrated circuits from the same manufacturer or from other manufacturers may also be incorporated into the PFC circuit.

The PFC IC 200 includes an inverting (INV) input 202 connected to an internal error amplifier, a compensation (COMP) output 204 connected to an output of the internal error amplifier, a multiplier (MULT) input 206 connected to an internal multiplier stage, a current sensing (CS) input 210 connected to an internal comparator of an internal control loop, a zero current detection (ZCD) input 214 connected to an internal zero current detector, and a gate driver (GD) output 216 connected to an internal push-pull output stage.

The PFC IC 200 further includes a supply voltage (VCC) input 220 that provides power to the IC. A ground return (GND) output 222 completes the power connection and provides a ground reference (e.g., the local circuit ground connection 184) for signals received and generated by the IC. A voltage buffer capacitor 224 is connected between the supply voltage input and the ground return output. The supply voltage input is connected to a low voltage source 226 that provides the DC voltage for the operation of the PFC IC. In the illustrated embodiment, the low voltage source receives AC power from the AC source 120. In other embodiments, the low voltage source may be coupled to receive the rectified DC voltage produced by the rectifier circuit 112. For example, the low voltage source may include a linear voltage regulator that provides a substantially constant DC voltage over a wide range of input voltages. The low voltage source may also be a battery.

As further shown in FIG. 1, the PFC circuit 114 further includes a multiplier circuit 230 coupled across the rectifier output filter capacitor 186 between the positive voltage output terminal 180 of the rectifier 112 and the local circuit ground connection 184, and to multiplier (MULT) input 206 of the PFC IC 200. The multiplier circuit 230 includes a first input voltage divider resistor 232 and a second input voltage divider resistor 234 connected in series between the positive voltage output terminal 180 from the rectifier circuit 112 and the local circuit ground connection 184. The two resistors are connected at a common node 236 to provide a voltage proportional to the time-varying output voltage from the rectifier circuit. The first and second input voltage divider resistors 232, 234 sense the voltage across the rectifier output filter capacitor 186 and provide a multiplier signal ($V_{MULT}$) to the multiplier (MULT) input 206 of the PFC IC 200. The multiplier signal ($V_{MULT}$) is the voltage at the common node 236. The common node is connected to the multiplier (MULT) input 206 of the PFC IC 200, which uses the input signal to control the timing of output signals to thereby control the power factor.

The PFC circuit 114 further includes a flyback transformer 240 having a main winding 242, a secondary winding 246 and an auxiliary winding 244. The main winding has a first terminal 250 and a second terminal 252. The auxiliary winding has a first terminal 254 and a second terminal 256. The secondary winding has a first terminal 260 and a second terminal 262. As noted by the dot convention on the windings, the three windings are mutually coupled, and the respective first terminals of the two windings are in phase.

The first terminal 250 of the main winding 242 of the flyback transformer 240 is connected to the positive voltage output terminal 180 of the rectifier circuit 112.

The second terminal 252 of the main winding 242 of the flyback transformer 240 is connected to a drain terminal 272 of an electronic switch 270. In the illustrated circuit, the electronic switch comprises an n-channel enhancement mode metal oxide semiconductor field effect transistor (MOSFET). The electronic switch also has a source terminal 274 and a gate terminal 276. The gate terminal 276 of the electronic switch is connected to the gate drive (GD) output 216 of the PFC IC 200. The source terminal 274 of the electronic switch is connected to a first terminal of a current sensing resistor 280 at a current sensing node 282. A second terminal of the current sensing resistor is connected to the local circuit ground connection 184. The current sensing resistor has a low resistance of, for example, 0.1 ohm such that the current flowing through the current sensing resistor generates a voltage on the current sensing node that is proportional to the magnitude of the current. The voltage generated on the current sensing node is coupled to the current sensing (CS) input 210 of the PFC IC via a current sensing input resistor 284. When the gate drive output of the PFC IC is active and the electronic switch is closed (e.g., conducts), current flows through the main winding of the flyback transformer to charge the inductor. The current increases at a rate (e.g., slope) determined by the voltage across the transformer (e.g., the voltage from the positive voltage output terminal 180 of the rectifier circuit 112) and by the inductance and resistance in the series connection from the positive voltage output terminal through the main winding and through the electronic switch to the local circuit ground connection 184.

The first terminal 254 of the auxiliary winding 244 of the flyback transformer 240 is connected to the local circuit ground connection 184. The second terminal 256 of the auxiliary winding of the flyback transformer is connected to a first terminal of a current limiting resistor 264. A second terminal of the current limiting resistor is connected to the zero current detection (ZCD) input 214 of the PFC IC 200. When current is flowing from the first terminal to the second terminal of the main winding of the flyback transformer, a negative voltage develops on the second terminal of the auxiliary winding with reference to the first terminal connected to the ground reference. Internal circuitry within the PFC IC clamps the ZCD input such that the ZCD input remains at zero volts with respect to the ground reference while the current flowing through the main winding. Accordingly, a current flows from the second terminal of the auxiliary winding through the current limiting resistor to the ZCD input of the PFC IC when current is increasing in the main winding.

The first terminal 260 of the secondary winding 246 of the flyback transformer 240 is connected to the local circuit ground reference 184. The second terminal 262 of the secondary winding is connected to the anode 292 of a PFC circuit output diode 290. A cathode 294 of the PFC circuit output diode is connected to a PFC circuit output node 300. As described below, a PFC circuit output voltage ($V_{PFC\_OUT}$) is produced on the PFC circuit output node.

A PFC circuit output filter capacitor 302 is connected between the PFC circuit output node 300 and the local circuit ground connection 184 to filter the power factor output voltage. In the illustrated embodiment, the PFC circuit output filter capacitor is an electrolytic capacitor.

The two-stage electronic switching power supply 100 includes a voltage sensing circuit 310 connected across the PFC circuit output filter capacitor 302 between the PFC circuit output node 300 and the local circuit ground connection 184. The voltage sensing circuit includes a first voltage sensing resistor 312 and a second voltage sensing resistor 314, which are connected in series between the PFC circuit output node and the local circuit ground connection. The first voltage sensing resistor is connected between the PFC circuit output node and a voltage sensing node 316. The second voltage sensing resistor is connected between the voltage sensing node and the local circuit ground reference.

A sensed voltage ($V_{SENSE}$) is produced on the voltage sensing node 316. The voltage sensing node is connected to the inverting (INV) input 202 of the PFC IC 200 to provide feedback to the PFC IC proportional to the PFC circuit output voltage. The PFC IC is responsive to the sensed voltage at the voltage sensing node to regulate the voltage on the PFC circuit output node. For example, the resistance values of the first voltage sensing resistor 312 and the second voltage sensing resistor 314 are selected to cause the sensed voltage at the voltage sensing node to be 2.5 volts when the PFC circuit output voltage ($V_{PFC\_OUT}$) on the PFC circuit output node has a selected magnitude. If the PFC circuit output voltage increases above the selected magnitude, the PFC IC adjusts the timing of the signal applied to the gate terminal of the electronic switch to reduce the PFC circuit output voltage. If the PFC circuit output voltage decreases below the selected magnitude, the PFC IC adjusts the timing of the signal applied to the gate terminal of the electronic switch to increase the PFC circuit output voltage.

A feedback compensation capacitor 330 is connected between the inverting (INV) input 202 and the compensation (COMP) output 204 of the PFC IC 200. The feedback compensation capacitor is connected as part of an integration control loop of the PFC IC. The integration control loop of the PFC IC operates to stabilize the output voltage on the PFC circuit output node 300.

The operation of the PFC circuit 114 is well known. Basically, the PFC IC 200 controls the timing of the gate voltage of the electronic switch 270 to selectively turn the electronic switch 270 on and off. The PFC IC compares the sensed voltage ($V_{SENSE}$) applied to the inverting (INV) input 202 from the voltage sensing node 316 to an internal reference voltage (e.g., 2.5 volts in the illustrated embodiment). The PFC IC modifies the timing of the gate drive signal from the gate drive (GD) output 216 to maintain the PFC circuit output voltage at a desired voltage level to thereby cause the sensed voltage to be equal to the internal reference voltage. The PFC IC monitors the current through the electronic switch via voltage on the current sensing (CS)

input from the current sensing node 282. The PFC IC controls the electronic switch to control the magnitude of the current to conform with a magnitude envelope corresponding to the time-varying magnitude of the voltage on the multiplier (MULT) input 206. In the critical conduction mode of operation, after the PFC IC turns the electronic switch off, the PFC IC does not turn the electronic switch on until the current is close to zero as determined by the current flowing into the zero current detection (ZCD) input 214.

When the electronic switch 270 is turned on, current flows from the positive voltage output terminal 180 of the rectifier circuit 112 through the main winding 242 of the flyback transformer 240 in the direction from the first terminal 250 to the second terminal 252 of the main winding. The current flows through the electronic switch to the local circuit ground connection 184. The current develops a magnetic charge in the inductor windings. The voltage across the main winding from the first terminal to the second terminal of the main winding causes a corresponding voltage across the secondary winding 246 and the auxiliary winding 244 from the respective first winding to the respective second windings. As discussed above, the resulting negative voltage on the second terminal 256 of the auxiliary winding causes a current to flow through the current limiting resistor 262 to the clamped ZCD input 214 of the PFC IC.

When current is flowing through the main winding 242 of the flyback transformer 240 as described above, the voltage on the second terminal 240 of the secondary winding is negative with respect to the local circuit ground connection 184. This causes the PFC circuit output diode 290 to be reverse biased such that no current flows through the secondary winding when current is flowing through the main winding.

When the electronic switch 270 is turned off, current can no longer flow through the main winding 242 of the flyback transformer 240 and the magnetic charge in the flyback transformer must discharge through the secondary winding 246 and the auxiliary winding 244. The main discharge path is via the PFC circuit output diode 290. The decreasing current flow as the flyback transformer discharges causes a voltage to develop from the second terminal 262 to the first terminal 260 that is opposite to the voltage when the flyback transformer was charging when the electronic switch was turned on. Accordingly, the PFC circuit output diode is forward biased. The current flow through the PFC circuit output diode to the PFC circuit output node 300 charges the PFC circuit output filter capacitor 302.

The output voltage ($V_{PFC\_OUT}$) from the PFC circuit 114 on the PFC circuit output node 300 is provided to a high voltage input terminal 340 of the DC-DC converter circuit 116. The DC-DC converter circuit also has a ground terminal 342 connected to the local circuit ground connection 184. The DC-DC converter circuit also has a component supply voltage terminal 344, which is connected to the output of the low voltage source 226. The output voltage is also provided as a feedback (sensed) signal to the PFC IC via the voltage sensing circuit 310 as described above.

The DC-DC converter circuit 116 operates in a conventional manner to convert the unregulated DC voltage on the high voltage input terminal 340 to a regulated DC voltage between a first output terminal 350 and a second output terminal 352 to drive the load 118. In an exemplary DC-DC converter circuit for supplying a plurality of LEDs, the DC-DC converter circuit controls the magnitude of the current flowing through the LEDs to maintain a selected illumination level of the LEDs in the load. For example, the DC-DC converter in the illustrated embodiment may be a switch-mode power supply, which is configured to provide a substantially constant current to the load. The switch-mode power supply operates by generating a high frequency switched DC signal having a variable duty cycle or a variable pulse width. The duty cycle or pulse width of the switched DC signal is controlled via feedback techniques to generate a selected output current.

The on time ($T_{ON}$) of the gate drive signal generated on the gate drive (GD) output 216 of the PFC IC 200 and applied to the gate terminal 276 of the electronic switch 270 is determined by the multiplier signal on the multiplier (MULT) input 206 of the PFC IC, by the input voltage $V_{IN\_RECT}$ applied to the first terminal 250 of the main winding 242 of the flyback transformer 240. For the illustrated embodiment incorporating the L6562 PFC IC from STMicroelectronics, it can be shown that $T_{ON}$ can be determined from the inductance ($L_{MAIN}$) of the main winding, the overall conductance (G) of the main winding circuit, the peak input voltage ($V_{IN\_PEAK}$), and the peak multiplier voltage ($V_{MULT\_PEAK}$) in accordance with the following equation:

$$T_{ON} = L_{MAIN} \times G \times \frac{V_{MULT\_PEAK}}{V_{IN\_PEAK}} \qquad (2)$$

In Equation (2), the inductance and the conductance are constants. The ratio of the peak multiplier voltage to the peak input voltage is also a constant determined by the first input voltage divider resistor 230 and the second input voltage divider resistor 232. Accordingly, $T_{ON}$ does not change if the overall magnitude of the input voltage changes and does not change within each half-cycle of the input voltage.

In contrast to the on time, the off time ($T_{OFF}$) does change with respect to the phases within each half cycle of the input voltage because the magnetic charge within the flyback transformer 240 created when the electronic switch 270 is on must discharge through the secondary winding 246 when the electronic switch is turned off. It can be shown that $T_{OFF}$ varies with the phase angle (θ) and the selected magnitude of the output voltage ($V_{OUT}$) in accordance with the following equation:

$$T_{OFF} = L_{MAIN} \times G \times \frac{V_{MULT\_PEAK} \times |\sin(\theta)|}{n \times V_{out}} \qquad (3)$$

In Equation (3), "n" is the turns ratio between the main winding 242 and the secondary winding 246 of the flyback transformer 240.

As shown in Equation (3), $T_{OFF}$ increases from the beginning of each half cycle of the input voltage to the midpoint of each half cycle (θ=90 degrees) and then decreases to the end of the half cycle.

The average current ($I_{AVG}$) through the main winding 242 of the flyback transformer 240 for one switch cycle that occurs at each phase angle (θ) can be defined in accordance with the following equation:

$$I_{AVG} = \frac{1}{2} \times I_{PEAK} \times \sin(\theta) \times \frac{T_{ON}}{T_{ON} + T_{OFF}(\theta)} = \qquad (4)$$

$$\frac{1}{2} \times k \times V_{MULT} \times \sin(\theta) \times \frac{T_{ON}}{T_{ON} + T_{OFF}(\theta)}$$

As shown in Equation (4), if $T_{OFF}(\theta)$ is a constant such as for example set to a maximum off time ($T_{OFF\_MAX}$), then the average current ($I_{AVG}$) through the main winding 242 of the flyback transformer 240 will be a perfect sinusoid shape because the peak multiplier voltage ($V_{MULT\_PEAK}$) is a perfect sinusoidal signal that follows the waveshape of the voltage from the positive voltage ($V_{IN\_RECT}$) output terminal 180. The average current ($I_{AVG}$) from Equation (4) can thus be simplified in accordance with the following equation:

$$I_{AVG} = \frac{1}{2} \times k \times V_{MULT} \times \sin(\theta) \times \frac{T_{ON}}{T_{ON} + T_{OFF\_MAX}} \quad (5)$$

In Equation (5), assume $T_{OFF\_MAX}$ is equal to the maximum off time of the electronic switch 270 (MOSFET) at the peak (e.g., the midpoint of each half cycle) of the line voltage. As shown in Equation (5), fixing the off time is one way to get a perfect sinusoid input current waveform.

According to the previous assumption (i.e., $T_{OFF}(\theta)$ being constant), the maximum off time ($T_{OFF\_MAX}$), can be simplified according to the following equation:

$$T_{OFF\_MAX} = L_{MAIN} \times G \times \frac{V_{MULT\_PEAK}}{n \times V_{out}} \quad (6)$$

FIGS. 2A-2D illustrate the relationships between the switch on times, the switch off times, the input voltage waveform, the ideal input current waveform, the actual input current waveform, the reference current waveform, the multiplier signal waveform, the ideal average inductor current waveform and the actual average inductor current waveform.

Figure 2A:
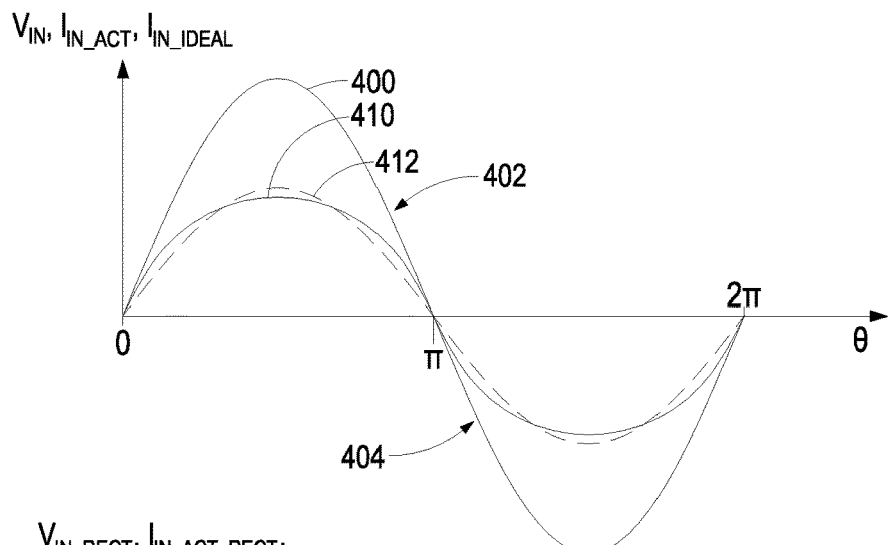
FIG. 2A illustrates a waveform of an AC input voltage ($V_{IN}$) and waveforms associated with an AC input current ($I_{IN}$) from the AC source of FIG. 1.

In FIG. 2A, a voltage waveform 400 represents the input voltage $V_{IN}$ of the AC source 120 over a full cycle comprising a first half-cycle 402 and a second half-cycle 404. A current waveform 410 represents an actual input current waveform $T_{IN\_ACT}$ over the full cycle. A current waveform 412 represents an ideal input current waveform $T_{IN\_IDEAL}$ over the full cycle. The voltage waveform is substantially sinusoidal. The ideal input current waveform is also substantially sinusoidal and is in phase with the input voltage. The actual input current waveform is also in phase with the input voltage; however, as described below, the actual input current is distorted because of total harmonic distortion (THD) caused by the conventional two-stage electronic switching power supply 100 illustrated in FIG. 1. As described above, the THD causes a reduction in the power factor of the conventional two-stage electronic switching power supply.

Figure 2B:
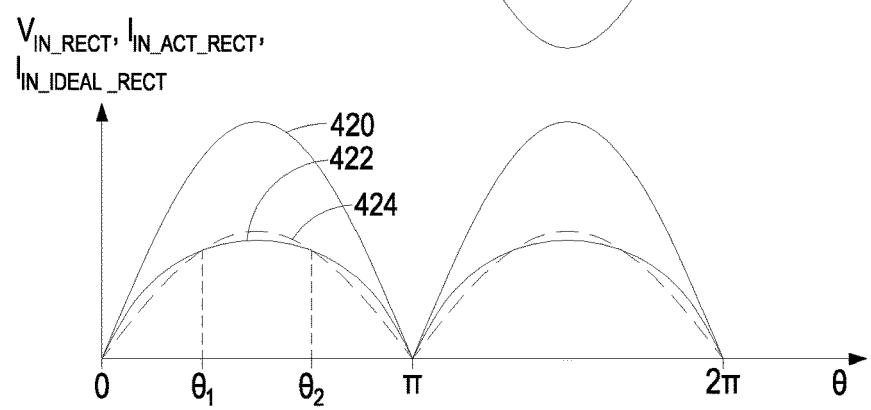
FIG. 2B illustrates waveforms associated with a positive voltage ($V_{IN\_RECT}$) output terminal of the rectifier of FIG. 1.

The input voltage $V_{IN}$ is rectified by the rectifier circuit 112 such that the rectified voltage on the positive voltage ($V_{IN\_RECT}$) output terminal 180 appears as two substantially identical positive half cycles as represented by a rectified input voltage ($V_{IN\_RECT}$) waveform 420 in FIG. 2B. The rectified actual input current is represented by a rectified actual input current ($I_{IN\_ACT\_RECT}$) waveform 422 in FIG. 2B. The rectified ideal input current is represented by an $T_{IN\_IDEAL\_RECT}$ waveform 424 in FIG. 2B. Again, each current waveform appears as two respective substantially identical half-cycles in FIG. 2B.

As illustrated in FIG. 2B, the rectified idealized input current waveform 424 is substantially sinusoidal and is in phase with the rectified input voltage waveform 420. In contrast, the rectified actual input current waveform 422 illustrates the effect of THD on the current waveform. Although the rectified actual current waveform is in phase with the rectified voltage input voltage waveform, the rectified actual current waveform is not sinusoidal. Rather, the rectified actual input current waveform has an initial portion at phase angles near the beginning of the first half cycle in which the rectified actual input current waveform increases faster than the rectified ideal input current waveform. As the phase angle increases, the rate of increase of the rectified actual input current waveform becomes lower than the rate of increase of the rectified ideal input current waveform. The lower rate of change of the rectified actual input current waveform continues through a middle portion of the waveform. At the midpoint of the half cycle, the rectified actual input current waveform decreases at a slower rate than the rectified ideal input current waveform until near the end of the half cycle when the rectified actual input current waveform starts to decrease at a greater rate than the rectified ideal input current waveform. The corresponding differences in the rates of change of the two waveforms are repeated in the second half cycle, and so forth.

The differences in the rates of change of the two waveforms causes the rectified actual input current waveform 422 to have a greater magnitude than the rectified ideal input current waveform 424 near the beginning and near the end of each half cycle. Furthermore, the rectified actual input current waveform has a lower magnitude in the middle portion of each half cycle. This causes the rectified actual input current waveform to have a flattened (or "pushed-down") appearance in comparison to the true sinusoidal ideal input current waveform. This flattened appearance causes THD and reduces the power factor as described above. In the illustrated example, the actual current waveform is greater than the ideal current waveform at phase angles between 0 and θ1. The actual current waveform is less than the ideal current waveform at phase angles between θ1 and θ2. The actual current waveform is greater than the ideal current waveform at phase angles between θ2 and n. The differences between the actual current waveform and the ideal current waveform are repeated in the second half cycle. As illustrated a first difference in phase angle between 0 and θ1 and a second difference between θ2 and n are equal or substantially equal. For example, in one embodiment, the phase angle θ1 may be approximately 42 degrees, and the phase angle θ2 may be approximately 138 degrees (approximately 42 degrees before the end of the half cycle).

The foregoing effect can be shown to be related to the on times and the off times of the electronic switch 270 which are controlled by the gate driver (GD) output 216 of the PFC IC 200 in FIG. 1. As illustrated by a gate drive (GD) waveform 440 in FIG. 2D, the PFC IC turns on the gate drive with a plurality of positive pulses 442 to turn on the electronic switch to enable current to flow through the main winding 242 of the flyback transformer 240. In FIG. 2D, each positive pulse 442 represents the on time ($T_{ON}$) of the electronic switch. Each positive pulse is followed by a zero voltage 444, which represents an off time ($T_{OFF}$) of the electronic switch. As described below, when the error signal within the PFC IC is not changing, the on times of the electronic switch are substantially constant as illustrated in FIG. 2D. On the other hand, the off times between the on times vary throughout each half cycle. The off times are greater near the middle of each half-cycle and are smaller near the beginning and the end of each half-cycle.

Figure 2C:
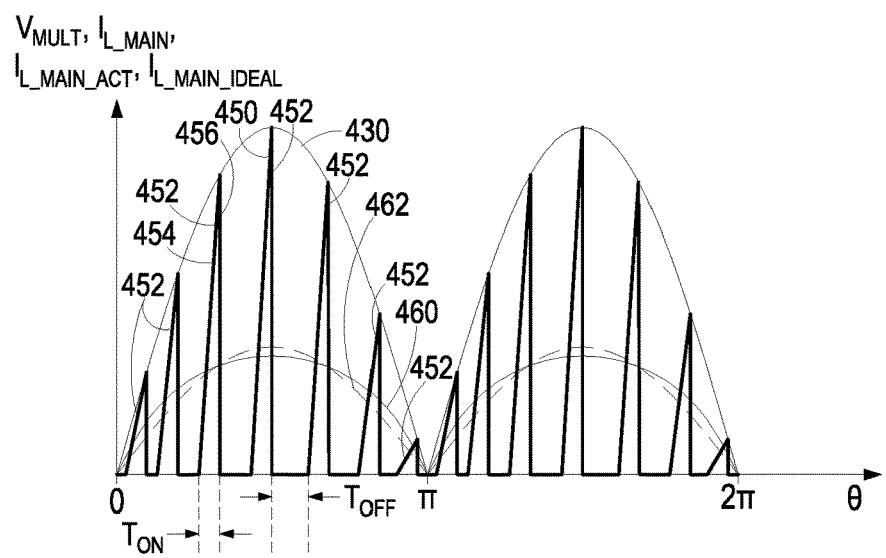
FIG. 2C illustrates a waveform of a multiplier signal ($V_{MULT}$) from the multiplier circuit of FIG. 1 and waveforms associated with a current through the main winding of the flyback transformer of FIG. 1.
Figure 2D:
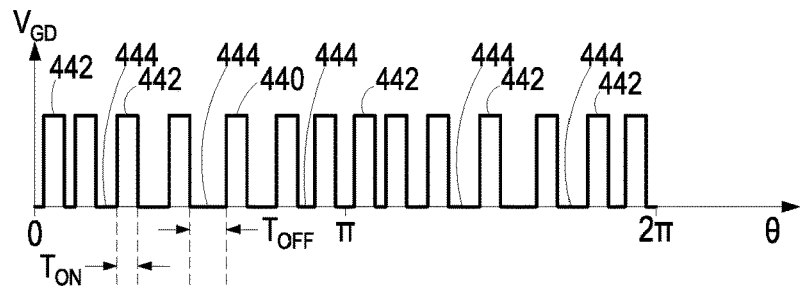
FIG. 2D illustrates a waveform of a gate drive (GD) output of the power factor correction integrated circuit (PFC IC) of FIG. 1.

As shown in FIG. 2C, a multiplier input voltage waveform 430 represents a magnitude of the multiplier signal ($V_{MULT}$) received at the multiplier (MULT) input 206 of the PFC IC 200. The current ($I_{L\_MAIN}$) through the main winding 242 of the flyback transformer 240 is represented by a discontinuous winding current waveform 450 in FIG. 2C. As shown in FIG. 2C, the winding current waveform uses the multiplier input voltage waveform as a reference signal. The winding current waveform comprises a plurality of current pulses 452. Each current pulse comprises an increasing leading edge 454 and a decreasing trailing edge 456. Each leading edge increases at a rate determined by the instantaneous rectified input voltage at the positive reference voltage output terminal 180 of the rectifier circuit 112. The rectified input voltage is applied across the main winding of the flyback transformer at the phase angle when the electronic switch 270 is turned on. As the rectified input voltage increases at increasing phase angles during the first half of the first half cycle, the rate of change of the leading edges increases. Furthermore, as the rectified input voltage increases, the magnitude of the multiplier input voltage waveform 430 also increases because the multiplier voltage on the multiplier (MULT) input 206 of the PFC IC 200 increases proportionally to the rectified input voltage (FIG. 2B). The time required for the winding current to reach a maximum magnitude corresponding to the multiplier input voltage waveform at each phase angle is substantially the same for each phase angle as described above with respect to the calculation of the on time ($T_{ON}$) in accordance with Equation (2) when the error signal generated within the PFC IC is not changing.

As further illustrated by the discontinuous winding current waveform 450 of the main winding 242 in FIG. 2C, the trailing edge of each current pulse decreases almost instantaneously because the electronic switch 270 disconnects the main winding 242 of the flyback transformer 240 from the circuit. As described above, the magnetic charge produced in the flyback transformer is discharged via the secondary winding 246. The timing of the discharge is described below.

As discussed above, the current in the secondary winding 246 is zero when the current is flowing in the main winding 242 (e.g., when the electronic switch is on). When the electronic switch turns off such that current can no longer flow in the main winding, the flyback transformer begins to discharge, which causes the polarities of the windings to reverse. The PFC circuit output diode 290 is now forward biased, and the current flows out of the secondary winding and through the PFC circuit output diode to charge the PFC circuit output filter capacitor 302.

As shown in FIG. 2C, the current ($I_{L\_MAIN}$) through the main winding 242 of the flyback transformer 240 during each half cycle may be averaged as represented by an actual average primary current ($I_{L\_MAIN\_ACT}$) waveform 460. The actual average primary current waveform 460 has the same flattened (or "pushed-down") appearance as the actual input current waveform 410 in FIG. 2A and the rectified actual input voltage waveform 420 in FIG. 2B due to the off time ($T_{OFF}$) of the electronic switch 270 varying with the phase angle (θ).

Further illustrated in FIG. 2C is an ideal average primary current ($I_{L\_MAIN\_IDEAL}$) waveform 462 having a perfect sinusoid shape. Because current ($I_{L\_MAIN}$) through the main winding 242 of the flyback transformer 240 during each half cycle follows the multiplier input voltage waveform 430, changing a shape of the multiplier input voltage waveform may compensate for the "pushed-down" appearance of the actual average primary current waveform 460 and thus improve the shape of the primary current waveform for improving THD performance and PF of the PFC circuit 114.

From the above discussion, there are two options for reducing the total harmonic distortion (THD) in order to improve (increase) the power factor of a flyback type PFC converter. The first option is to fix the off time ($T_{OFF}$) of the electronic switch 270. The second option is to provide a different multiplier signal to change the actual average primary current waveform 460 associated with the current ($I_{L\_MAIN}$) through the main winding 242 of the flyback transformer 240

The off time of the electronic switch 270 is controlled internally by the control loop of the PFC circuit 114. Accordingly, it is not easy to change the off time of the electronic switch externally without disturbing the operating mode of the PFC circuit.

As described herein, the multiplier circuit 230 may be altered in order to produce an artificial multiplier signal ($V_{MULT\_ART}$) having a specific wave-shape to improve the THD associated with of a flyback type PFC converter and thus improve the power factor of the flyback type PFC converter.

Figure 3A:
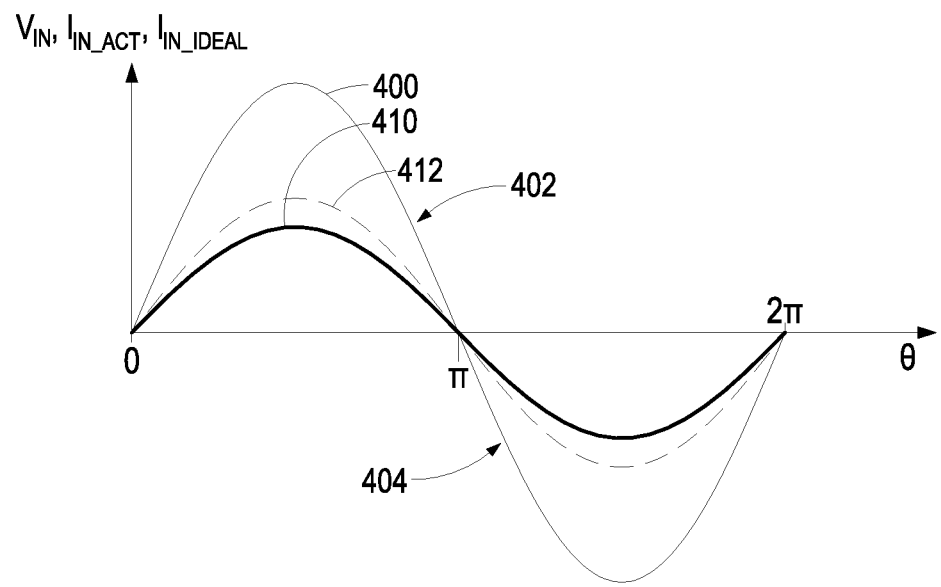
FIG. 3A illustrates the waveform of the AC input voltage ($V_{IN}$) and the waveforms associated with the AC input current ($I_{IN}$) from the AC source of FIG. 1 as shown in FIG. 2A.
Figure 3B:
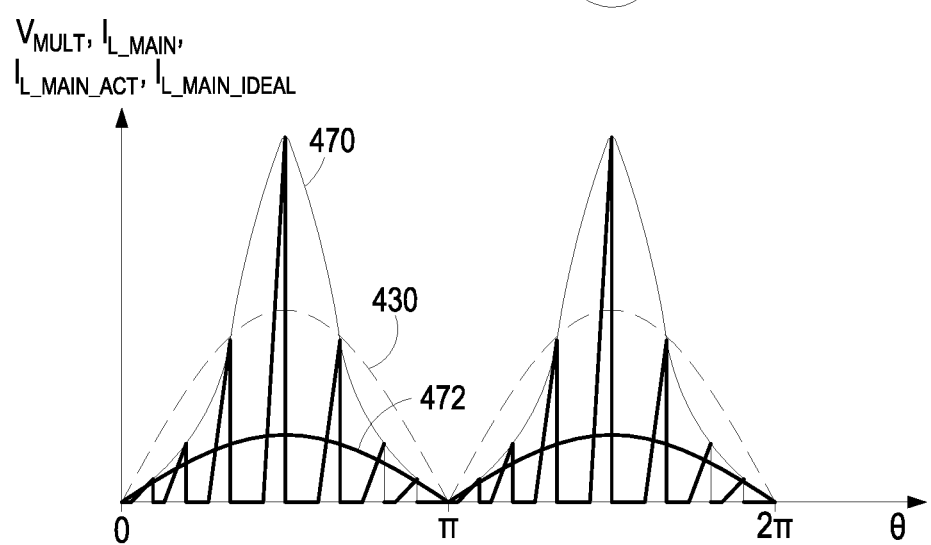
FIG. 3B illustrates a theoretical multiplier waveform of a multiplier signal configured to compensate for a "pushed down" effect of a waveform associated with the current through the main winding of the flyback transformer of FIG. 1 as shown in FIG. 2C.

FIGS. 3A and 3B illustrates the relationships between the on times, the off times, the input voltage waveform, the ideal input current waveform, the actual input current waveform, the original multiplier signal waveform, the theoretical artificial multiplier signal waveform, and the theoretical average inductor current waveform based upon the artificial multiplier signal.

FIG. 3A is a reproduction of FIG. 2A. FIG. 3B includes a theoretical artificial multiplier signal waveform 470 corresponding to the theoretical artificial multiplier signal ($V_{T\_MULT\_ART}$), as described above. The artificial multiplier signal waveform may have a shape similar to a "Pulled Up" (or "Pulled-Up-From-Top") sinusoid waveform. The "Pulled Up" shaped of the artificial multiplier signal waveform may compensate for the flattened (or "pushed-down") shape of the actual average primary current waveform 460. Accordingly, a theoretical average primary current ($I_{T\_AVG}$) through the main winding 242 of the flyback transformer 240 is represented by the theoretical average primary current waveform 462. The average primary current waveform will have a waveform shape close to a sinusoid shape due to the compensation provided by the theoretical artificial multiplier signal waveform.

Figure 4:
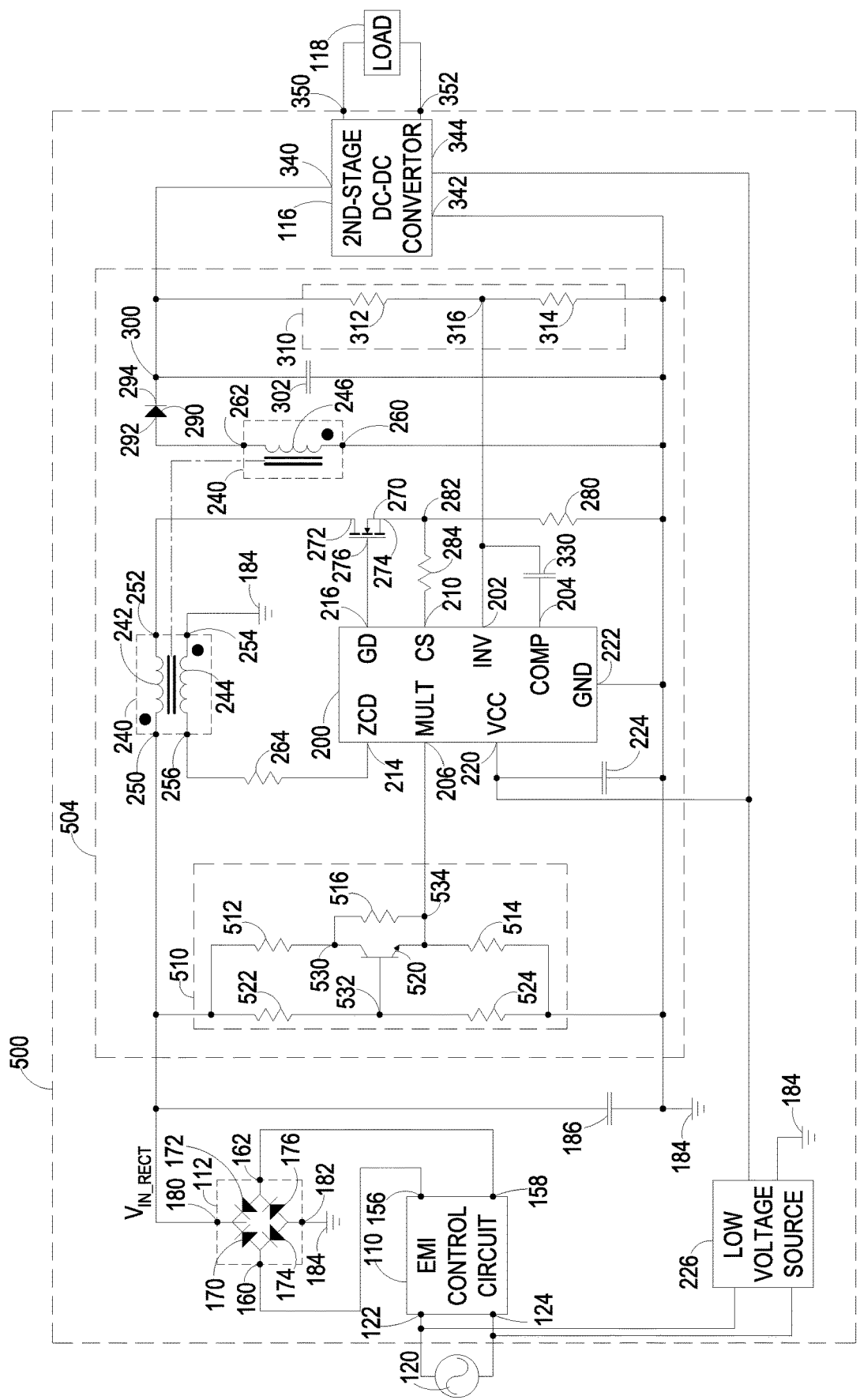
FIG. 4 illustrates an improved version of the two-stage electronic switching power supply of FIG. 1 in accordance with a first embodiment of the present disclosure.

FIG. 4 illustrates an improved two-stage electronic switching power supply 500 in accordance with a first embodiment of the present disclosure. The improved two-stage electronic switching power supply 500 improves the power factor and THD of the PFC circuit 114. The improved two-stage electronic switching power supply of FIG. 4 is similar to the previously described two-stage electronic switching power supply 100 of FIG. 1 and like elements are numbered the same as in FIG. 1. Unlike the previously described two-stage electronic switching power supply of FIG. 1, the improved two-stage electronic switching power supply of FIG. 4 includes an improved power factor correction (PFC) circuit 504 that includes an improved multiplier circuit 510.

The improved multiplier circuit 510 is coupled across the rectifier output filter capacitor 186 between the positive voltage output terminal 180 of the rectifier 112 and the local circuit ground connection 184, and to the multiplier (MULT) input 206 of the PFC IC 200. The multiplier circuit 510 includes a first input voltage divider resistor ($R_1$) 512, a second input voltage divider resistor ($R_2$) 514, a third input voltage divider resistor ($R_3$) 516, an electronic switch 520, a first control resistor ($R_4$) 522, and a second control resistor ($R_5$) 524. The multiplier circuit 510 is configured to provide a multiplier signal ($V_{MULT\_PULLED\_UP}$) to the multiplier (MULT) input 206 of the PFC IC 200. The multiplier signal ($V_{MULT\_PULLED\_UP}$) is similar to the artificial multiplier signal ($V_{MULT\_ART}$) as previously discussed.

As illustrated, the electronic switch 520 comprises an n-type bipolar junction transistor (BJT). In other embodiments, the electronic switch 520 may be an n-channel enhancement mode metal oxide semiconductor field effect transistor (MOSFET) or the like. The electronic switch 520 includes a collector terminal 530, a base terminal 532, and an emitter terminal 534.

The first control resistor is coupled between the positive voltage ($V_{IN\_RECT}$) output terminal 180 of the rectifier circuit 112 and the base terminal 532 of the electronic switch 520. The second control resistor is coupled between the base terminal and the local circuit ground connection 184. The first control resistor 522 and the second control resistor 524 are used to drive the base terminal 532 of the electronic switch 520. The electronic switch has a turn-on threshold voltage (Vth) defined in accordance with the following equation:

$$V_{th} = \frac{R_5}{R_5 + R_4} \times V_{IN\_RECT} \times \sin(\theta_1) = \frac{R_5}{R_5 + R_4} \times V_{IN\_RECT} \times \sin(\theta_2) \quad (7)$$

As shown in Equation (7), the ratio of the first control resistor ($R_4$) and the second control resistor ($R_5$) is designed to turn the electronic switch on at a first phase angle ($\theta_1$) and to turn the electronic switch off at a second phase angle ($\theta_2$) during each half cycle of the voltage at the positive voltage ($V_{IN\_RECT}$) output terminal 180 of the rectifier circuit 112. The electronic switch being off corresponds to a first operational state of the multiplier circuit 510. The electronic switch being on corresponds to a second operational state of the multiplier circuit 510.

The first input voltage divider resistor 512 is coupled between the positive voltage ($V_{IN\_RECT}$) output terminal 180 of the rectifier circuit 112 and the collector terminal 530 of the electronic switch 520. The second input voltage divider resistor 514 is coupled between the emitter terminal 534 and the local circuit ground connection 184. Finally, the third input voltage divider resistor 516 is coupled between the collector terminal and the emitter terminal.

Figure 5A:
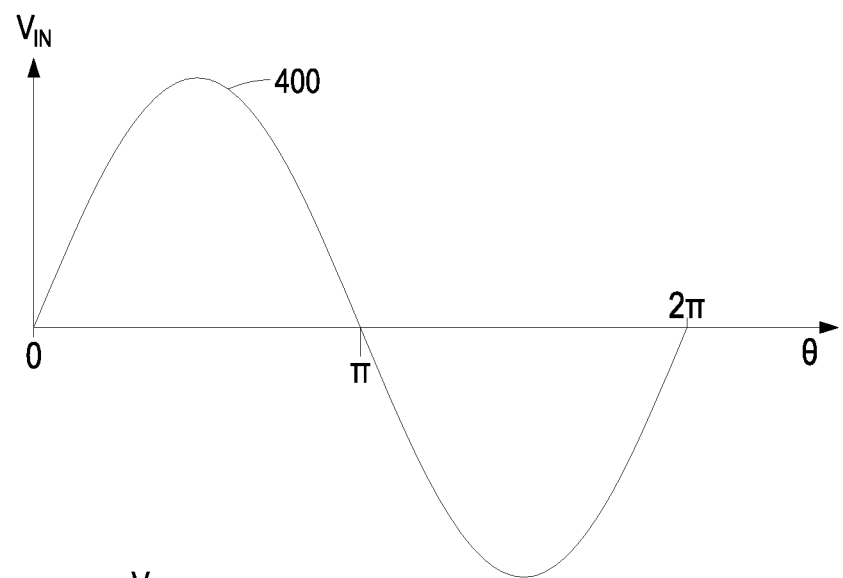
FIG. 5A illustrates the waveform of the AC input voltage ($V_{IN}$) from the AC source of FIG. 4.
Figure 5B:
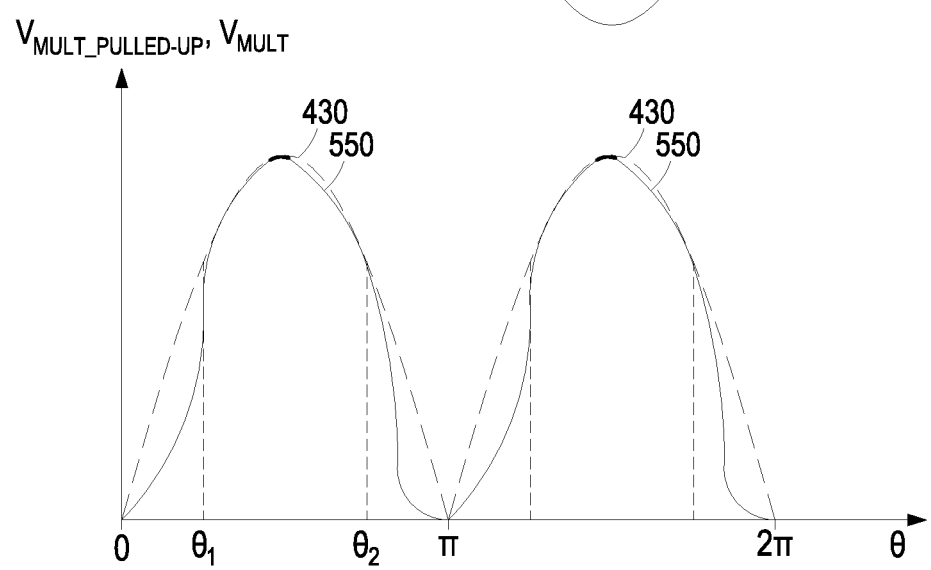
FIG. 5B illustrates a multiplier input voltage waveform associated with a magnitude of the multiplier signal of FIG. 4.

FIGS. 5A and 5B illustrates the operational characteristics of the multiplier circuit 510. FIG. 5A includes the voltage waveform ($V_{IN}$) 400 of FIG. 2A. FIG. 5B includes multiplier input voltage waveform 430 of FIG. 2C. FIG. 5B further includes a multiplier input voltage waveform 550 associated with a magnitude of the multiplier signal ($V_{MULT\_PULLED\_UP}$) received at the multiplier (MULT) input 206 of the PFC IC 200 as shown in FIG. 4. Before the first phase angle ($\theta_1$) and after the second phase angle ($\theta_2$) during each half cycle, the voltage across the second control resistor ($R_5$) 524 is less than the turn-on threshold voltage (Vth) of the electronic switch 520. Accordingly, the electronic switch is off before the first phase angle ($\theta_1$) and after the second phase angle ($\theta_2$) for each half cycle of the multiplier input voltage waveform 550 which is in phase with the voltage from the positive voltage ($V_{IN\_RECT}$) output terminal 180 of the rectifier circuit 112. The multiplier signal ($V_{MULT\_PULLED\_UP}$) produced by the multiplier circuit 510 is defined before the first phase angle ($\theta_1$) and after the second phase angle ($\theta_2$) in accordance with the following equation:

$$V_{MULT\_PULLED\_UP} = \frac{R_2}{R_2 + R_1 + R_3} \times V_{IN\_RECT} \times \sin(\theta) \quad (8)$$

As shown in Equation (8), the multiplier circuit 510, when the electronic switch 520 is off, effectively has three resistors (e.g., the first, second, and third input voltage divider resistors 512, 514, 516).

The voltage across the second control resistor ($R_5$) 524 is greater than the turn-on threshold voltage (Vth) of the electronic switch 520 between the first phase angle ($\theta_1$) and the second phase angle ($\theta_2$). Accordingly, the electronic switch is on between the first phase angle ($\theta_1$) and the second phase angle ($\theta_2$) for each half cycle of the multiplier input voltage waveform 550, which is in phase with the voltage from the positive voltage ($V_{IN\_RECT}$) output terminal 180 of the rectifier circuit 112. The multiplier signal ($V_{MULT\_PULLED\_UP}$) produced by the multiplier circuit 510 is defined between the first phase angle ($\theta_1$) and the second phase angle ($\theta_2$) in accordance with the following equation:

$$V_{MULT\_PULLED\_UP} = \frac{R_2}{R_2 + R_1} \times V_{IN\_RECT} \times \sin(\theta) \quad (9)$$

As shown in Equation (9), the multiplier circuit 510, when the electronic switch 520 is on, effectively has only two resistors (e.g., the first input voltage divider resistor 512 and the second input voltage divider resistor 514).

As shown in FIG. 5B, the original multiplier signal ($V_{MULTI}$) associated with the typical conventional two-stage electric switching power supply 100 of FIG. 1 produces the multiplier input voltage waveform 430 that has a perfect sinusoid shape which follows equation (9) at all phase angles ($\theta$).

As further shown in FIG. 5B, the multiplier signal waveform 550 corresponding to the multiplier signal ($V_{MULT\_PULLED\_UP}$) before the first phase angle ($\theta_1$) and after the second phase angle ($\theta_2$) is less than the multiplier input voltage waveform 430 associated with the original multiplier signal ($V_{MULT}$) due to the third input voltage divider resistor ($R_3$) 516 being in series with the first input voltage divider resistor ($R_1$) 512 and the second input voltage divider resistor ($R_2$) 514. The multiplier signal waveform 550 between the first phase angle ($\theta_1$) and the second phase angle ($\theta_2$) is substantially the same as the multiplier input voltage waveform 430 associated with the original multiplier signal ($V_{MULT}$) due to third input voltage divider resistor ($R_3$) 516 being bypassed by the electronic switch 520. The slight difference between the multiplier signal waveform 550 and the multiplier input voltage waveform 430 between the first phase angle ($\theta_1$) and the second phase angle ($\theta_2$) is due to the turn-on/turn-off delay associated with the electronic switch 520.

With regard to the new multiplier circuit 510 of the power supply 500, it is important to note that the resistance of the first control resistor ($R_4$) 522 and the resistance of the second control resistor ($R_5$) 524 may be adjusted to change the turn-on time for the electronic switch 520. Furthermore, the resistance of third input voltage divider resistor ($R_3$) 516 may be adjusted to alter a shape of the multiplier signal waveform 550 before the electronic switch 520 is turned on (e.g., before the first phase angle ($\theta_1$) and after the second phase angle ($\theta_2$)).

The new multiplier circuit 510, and specifically the "Pulled Up" multiplier signal ($V_{MULT\_PULLED\_UP}$) produced thereby works well to compensate the "Push-Down" effect due to the varying off time ($T_{OFF}$). The following table shows great improvement on THD and power factor for an exemplary 50-watt PFC:

TABLE II

Power Factor (PF) and THD for 50-watt Flyback PFC Before and After New Multiplier Circuit 510 is Applied

| | 50-Watt PFC | | | |
|---|---|---|---|---|
| | Flyback Type PFC | | Flyback Type PFC (with "new" multiplier circuit 510) | |
| $V_{IN}$ | THD | PF | THD | PF |
| 120 V | 8% | 0.96 | 7% | 0.96 |
| 277 V | 18% | 0.9 | 8% | 0.93 |

Table II illustrates that the new multiplier circuit 510 effectively improves the flyback type PFC THD and PF. The new multiplier circuit 510 enables the flyback type PFC topology more practical for "high end" power supply design applications.

Figure 6:
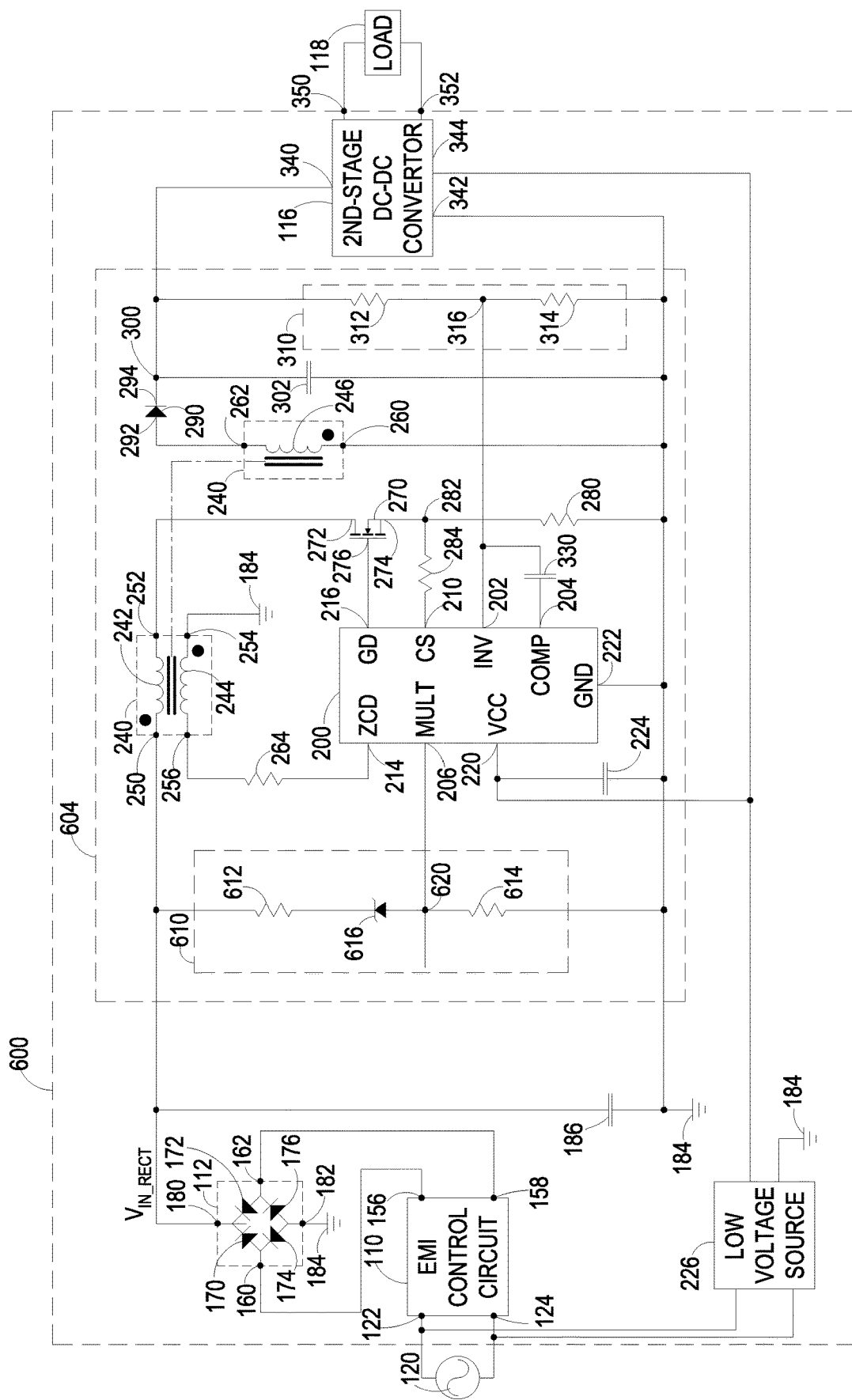
FIG. 6 illustrates an improved version of the two-stage electronic switching power supply of FIG. 1 in accordance with a second embodiment of the present disclosure.

FIG. 6 illustrates an improved two-stage electronic switching power 600 in accordance with a second embodiment of the present disclosure. The improved two-stage electronic switching power supply 600 improves the power factor and THD of the PFC circuit 114. The improved two-stage electronic switching power supply of FIG. 6 is similar to the previously described two-stage electronic switching power supply 100 of FIG. 1 and like elements are numbered the same as in FIG. 1. Unlike the previously described two-stage electronic switching power supply of FIG. 1, the improved two-stage electronic switching power supply of FIG. 6 includes an improved power factor correction (PFC) circuit 604 that has an improved multiplier circuit 610.

The improved multiplier circuit 610 is coupled across the rectifier output filter capacitor 186 between the positive voltage output terminal 180 of the rectifier 112 and the local circuit ground connection 184, and to the multiplier (MULT) input 206 of the PFC IC 200. The multiplier circuit 610 includes a first input voltage divider resistor ($R_1$) 612, a second input voltage divider resistor ($R_2$) 614, and a Zener diode 616. The first input voltage divider resistor 612 is connected between the positive voltage output terminal 180 of the rectifier 112 and a cathode of the Zener diode 616. An anode of the Zener diode 616 is connected to a common node 620. The second input voltage divider resistor 614 is connected between the common node 620 and the local circuit ground connection 184. The common node 620 is coupled to the multiplier (MULT) input 206 of the PFC IC 200.

The Zener diode 616 has a breakdown voltage ($V_Z$). Before the voltage across the Zener diode 616 reaches the breakdown voltage ($V_Z$), the Zener diode functions like a big resistor. Prior to the breakdown voltage ($V_Z$), the multiplier circuit 610 operates in accordance with the first operational state. After the voltage across the Zener diode 616 reaches the breakdown voltage ($V_Z$), the Zener diode functions like a voltage source. Above the breakdown voltage ($V_Z$), the multiplier circuit 610 operates in accordance with the second operational state.

The effect of the Zener diode 616 in the multiplier circuit 610 is similar to the third input voltage divider resistor ($R_3$) 516, the electronic switch 520, the first control resistor ($R_4$) 522, and the second control resistor ($R_5$) 524 of the multiplier circuit 510 of the power supply 500 of FIG. 4. A multiplier signal produced by the multiplier circuit 610 is similar to the multiplier signal ($V_{MULT\_PULLED\_UP}$) produced by the improved multiplier circuit 510.

Figure 7:
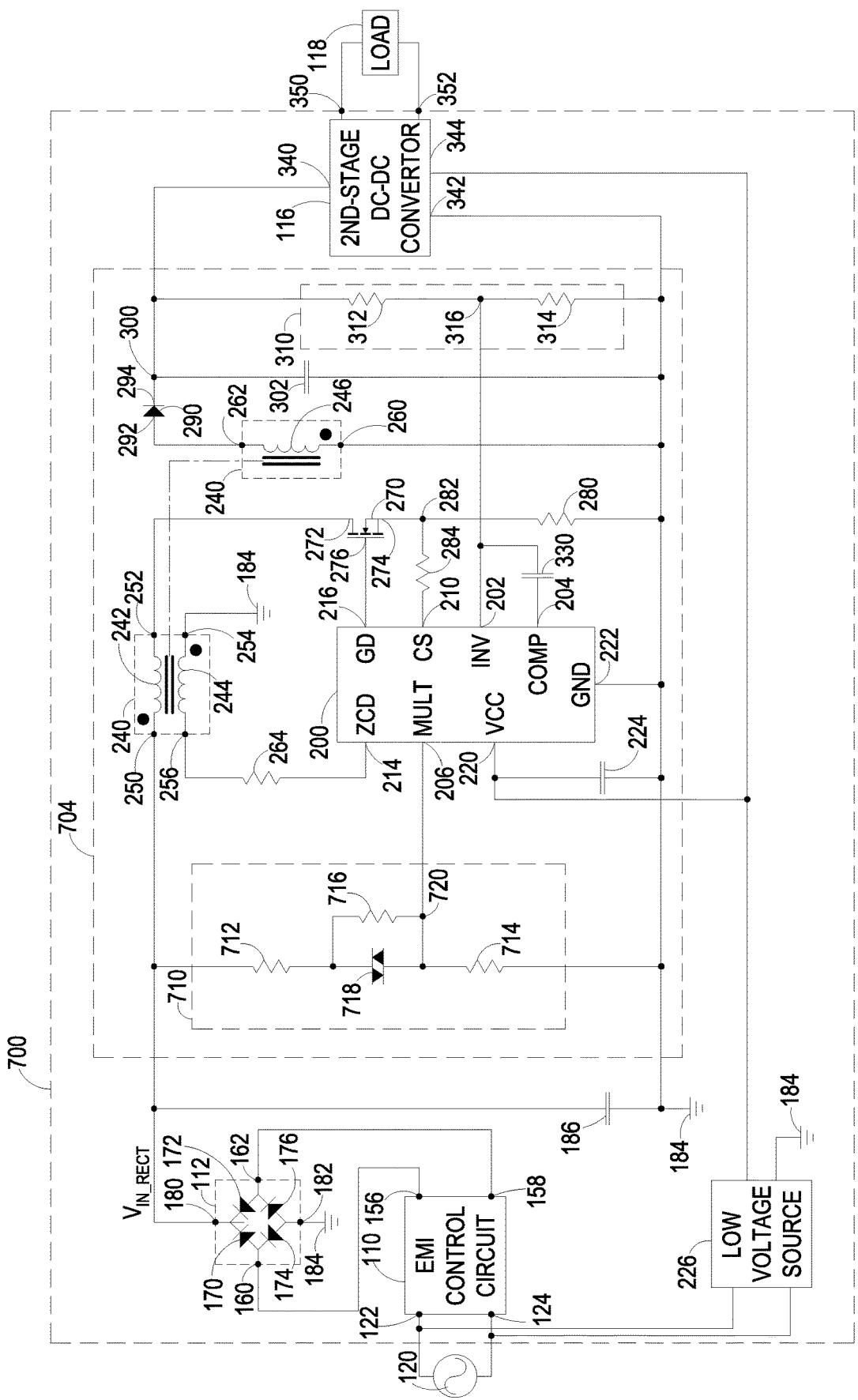
FIG. 7 illustrates an improved version of the two-stage electronic switching power supply of FIG. 1 in accordance with a third embodiment of the present disclosure.

FIG. 7 illustrates an improved two-stage electronic switching power 700 in accordance with a third embodiment of the present disclosure. The improved two-stage electronic switching power supply 700 improves the power factor and THD of the PFC circuit 114. The improved two-stage electronic switching power supply of FIG. 7 is similar to the previously described two-stage electronic switching power supply 100 of FIG. 1 and like elements are numbered the same as in FIG. 1. Unlike the previously described two-stage electronic switching power supply of FIG. 1, the improved two-stage electronic switching power supply of FIG. 7 includes an improved power factor correction (PFC) circuit 704 that has an improved multiplier circuit 710.

The new multiplier circuit 710 is coupled across the rectifier output filter capacitor 186 between the positive voltage output terminal 180 of the rectifier 112 and the local circuit ground connection 184, and to the multiplier (MULT) input 206 of the PFC IC 200. The multiplier circuit 510 includes a first input voltage divider resistor ($R_1$) 712, a second input voltage divider resistor ($R_2$) 714, a third input voltage divider resistor ($R_3$) 716, a diode for alternating current (DIAC) 718. The The first input voltage divider resistor ($R_1$) 712 is coupled at a first end to the positive voltage output terminal 180 of the rectifier 112. The DIAC 718 and the third input voltage divider resistor ($R_3$) 716 are coupled in parallel between a second end of the first input voltage divider resistor ($R_1$) 712 and a common node 720. The second input voltage divider resistor ($R_2$) 714 is coupled between the common node 720 and the local circuit ground connection 184. The common node 720 is coupled to the multiplier (MULT) input 206 of the PFC IC 200.

The DIAC 718 has a breakdown voltage ($V_{BO}$). Before the voltage across the DIAC 718 reaches the breakdown voltage ($V_{BO}$), the DIAC functions like an open circuit, thereby forcing the third input voltage divider resistor 716 to be in series with the first and second input voltage divider resistors 712, 714. Prior to the breakdown voltage ($V_{BO}$), the multiplier circuit 710 operates in accordance with the first operational state. After the voltage across the DIAC 718 reaches the breakdown voltage ($V_{BO}$), the DIAC conducts electricity, thereby short circuiting the third input voltage divider resistor 716 from the circuit. Above the breakdown voltage ($V_{BO}$), the multiplier circuit 710 operates in accordance with the second operational state.

The effect of the DIAC 718 in the multiplier circuit 710 is similar to the electronic switch 520, the first control resistor ($R_4$) 522, and the second control resistor ($R_5$) 524 of the multiplier circuit 510 of the power supply 500 of FIG. 4. The third input voltage divider resistor 716 of the multiplier circuit 710 functions similarly to the third input voltage divider resistor ($R_3$) 516 of the multiplier circuit 510. A multiplier signal produced by the multiplier circuit 710 is similar to the multiplier signal ($V_{MULT\_PULLED\_UP}$) produced by the improved multiplier circuit 510.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power supply comprising:
a direct current (DC) power source coupled to receive input power from an alternating current (AC) power source and configured to provide a DC power across first and second lines;
an energy storage device coupled across the first and second lines; and
a power factor correction (PFC) circuit coupled across the first and second lines, and comprising:
an inductive element having a first end coupled to a first end of the energy storage device;
a controlled switching element coupled between a second end of the inductive element and the second line;
an integrated circuit (IC) configured to control on-times and off-times of the switching element and thereby a current through the inductive element in response to a multiplier signal received at a multiplier signal input of the IC; and
a multiplier circuit comprising a switching device and configured to define the multiplier signal to the multiplier signal input by switching between a first operational mode of the multiplier circuit and a second operational mode of the multiplier circuit during each half-cycle of the DC power, wherein the multiplier signal is provided as an ideal sinusoid corresponding to a shape of the input power from the AC power source independently of varying off-times of the PFC switching element.

2. The power supply of claim 1, wherein the multiplier signal is modified to push down a waveform shape of the current through the inductive element during the first operational mode, wherein a total harmonic distortion (THD) of the PFC circuit is reduced.

3. The power supply of claim 1, wherein:
the first operational mode of the multiplier circuit is associated with a voltage across the energy storage device being below a threshold voltage; and
the second operational mode of the multiplier circuit is associated with the voltage across the energy storage device being above the threshold voltage.

4. The power supply of claim 1, wherein:
the DC power across the first and second lines includes a DC voltage waveform;
the first operational mode of the multiplier circuit occurs before a first phase angle of the DC voltage waveform and after a second phase angle of the DC voltage waveform during each half-cycle of the DC power; and
the second operational mode of the multiplier circuit occurs between the first and second phase angles of the DC voltage waveform during each half-cycle of the DC power.

5. The power supply of claim 1, wherein:
the multiplier circuit includes a first resistor, a second resistor, a third resistor, a fourth resistor, a fifth resistor, and the switching device configured to switch between the first operational mode and the second operational mode during each half-cycle of the DC power; and
the first operational mode associated with the switching device being off and the second operational mode associated with the switch being on.

6. The power supply of claim 5, wherein:
the switching device comprising a base node, a collector node, and an emitter node coupled to the multiplier signal input terminal;
the first resistor is coupled between the first line and the collector node;
the second resistor is coupled between the emitter node and the second line;
the third resistor is coupled between collector node and the emitter node;
the fourth resistor coupled between the first line and the base node; and
the fifth resistor coupled between the base node and the second line.

7. The power supply of claim 6, wherein:
the first, second, and third resistors are coupled in series when the multiplier circuit is in the first operational mode; and
the third resistor is short circuited when the multiplier circuit is in the second operational mode.

8. The power supply of claim 1, wherein:
the multiplier circuit includes a first resistor and the switching device comprises a Zener diode coupled between the first line and the multiplier signal input terminal; and the multiplier circuit includes a second resistor coupled between the multiplier signal input terminal and the second line.

9. The power supply of claim 8, wherein:
the Zener diode is associated with a Zener voltage;
the multiplier circuit operates in the first operational mode when the voltage across the capacitor is below the Zener voltage; and
the multiplier circuit operates in the second operational mode when the voltage across the capacitor is above the Zener voltage.

10. The power supply of claim 1, wherein:
the multiplier circuit includes a first resistor, a second resistor, a third resistor, and the switching device comprises a DIAC;
the first resistor is coupled to the first line;
the DIAC and the third resistor are coupled in parallel between the first resistor and the multiplier signal input terminal; and
the second resistor is coupled between the multiplier signal input terminal and the second line.

11. The power supply of claim 10, wherein:
the DIAC is associated with a breakdown voltage;
the multiplier circuit operates in the first operational mode when the voltage across the capacitor is below the breakdown voltage; and
the multiplier circuit operates in the second operational mode when the voltage across the capacitor is above the breakdown voltage.

12. The power supply of claim 11, wherein:
the DIAC operates as an open circuit during the first operational mode; and
the DIAC short circuits the third resistor during the second operational mode.

13. The power supply of claim 1, wherein:
the multiplier signal includes a multiplier signal waveform shape defined during each half-cycle of the DC power;
a beginning portion and an end portion of the multiplier signal waveform shape is defined during the first operational mode of the multiplier circuit; and
a middle portion of the multiplier signal waveform shape is defined during the second operational mode of the multiplier circuit.

14. A multiplier circuit for coupling across first and second input lines of a power factor correction (PFC) circuit and to a multiplier input of an integrated circuit (IC) of the PFC circuit, the multiplier circuit comprising:
a first resistor coupled between the first input line and the multiplier input;
a second resistor coupled between the multiplier input and the second input line, the second resistor configured to define a multiplier voltage for transmission to the multiplier input of the IC of the PFC circuit, the multiplier voltage having a multiplier voltage waveform which repeats during each half-cycle of an input voltage receivable across the first and second input lines of the PFC; and
a switching circuit configured to reduce the multiplier voltage prior to a first phase angle associated with each half cycle and after a second phase angle associated with each half-cycle,
wherein the first and second resistors operate in series as a voltage divider between the first and second input lines of the PFC between the first phase angle and the second phase angle during each half-cycle.

15. The multiplier circuit of claim 14, wherein:
the switching circuit includes a first voltage divider resistor, a second voltage divider resistor, a third voltage divider resistor, and an electronic switch;
the first voltage divider resistor coupled between the first input line and a base terminal of the electronic switch;
the second voltage divider resistor coupled between the base terminal and the second input line;
the first resistor is coupled between the first input line and a collector terminal of the electronic switch;
the second resistor is coupled between an emitter terminal of the electronic switch and the second input line.

16. The multiplier circuit of claim 14, wherein:
the electronic switch includes a threshold voltage;
below the threshold voltage the third voltage divider resistor operates in series with the first and second resistors; and
above the threshold voltage the third voltage divider resistor is bypassed by the electronic switch.

17. The multiplier circuit of claim 14, wherein:
the switching circuit includes a Zener diode coupled between the first resistor and the multiplier input;
the Zener diode having a larger effective resistance when a voltage across the Zener diode is lower than a Zener voltage of the Zener diode.

18. The multiplier circuit of claim 14, wherein:
the switching circuit includes a DIAC and a voltage divider resistor coupled in parallel;
the DIAC and the voltage divider resistor coupled between the first resistor and the multiplier input;
a current exclusively flows through the voltage divider resistor when a voltage across the multiplier circuit is below a breakdown voltage of the DIAC; and
the current exclusively flows through the DIAC when the voltage across the multiplier circuit is above the breakdown voltage of the DIAC.

19. A method of improving a total harmonic distortion (THD) of a line current received by a power factor correction (PFC) circuit, the method comprising:
generating a reduced multiplier signal voltage prior to a first phase angle of the line current and after a second phase angle of the line current during each half cycle of the line current; and
generating an unaltered/normal multiplier signal voltage between the first phase angle and the second phase angle during each half-cycle of the line current.

* * * * *